United States Patent [19]
Rosendahl et al.

[11] 3,835,629
[45] Sept. 17, 1974

[54] CROP CONDITIONERS
[75] Inventors: John R. Rosendahl, New Berlin, Wis.; Willard W. Lay, Stephenville, Tex.; Paul H. Harrer, La Porte, Ind.
[73] Assignee: Allis-Chalmers Corporation, Milwaukee, Wis.
[22] Filed: Mar. 8, 1973
[21] Appl. No.: 339,319

[52] U.S. Cl................. 56/14.4, 56/DIG. 1, 56/119
[51] Int. Cl............................................ A01d 57/26
[58] Field of Search ....... 56/DIG. 1, 14.4, 192, 119, 56/314, 503

[56] References Cited
UNITED STATES PATENTS
| | | | |
|---|---|---|---|
| 2,981,045 | 4/1961 | Blanshine et al. | 56/119 X |
| 3,018,601 | 1/1962 | Griffin et al. | 56/119 |
| 3,474,601 | 10/1969 | Burrough et al. | 56/DIG. 1 |

Primary Examiner—Louis G. Mancene
Assistant Examiner—J. N. Eskovitz
Attorney, Agent, or Firm—Kenneth C. McKivett

[57] ABSTRACT

The invention relates to an agricultural hay harvesting machine of the mower-conditioner-windrower type having a main, wheeled frame extending in a fore and aft direction, a header subframe pivotally mounted on the main frame and including a header mounted on such subframe, a reel mounted over the floor of such header and wherein such floor has a sickle bar mechanism on the forward end thereof and a pair of cooperating crusher rolls mounted adjacent to the rear of such floor, a lean bar transversely extending across the forward end of the header, crop hold down and guiding tines attached to such lean bar and extending rearwardly between such reel and such floor to a position adjacent the bight of such crusher rolls for guiding crop material from such sickle bar to such crushing rolls.

4 Claims, 3 Drawing Figures

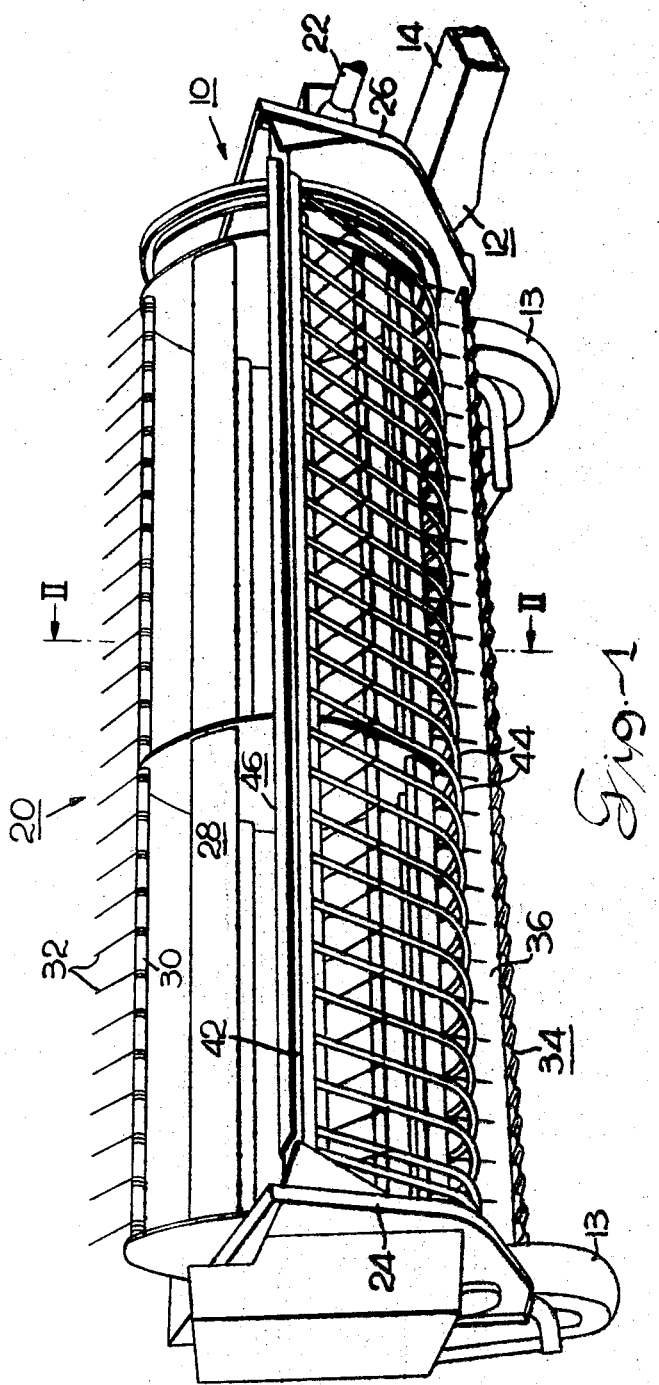

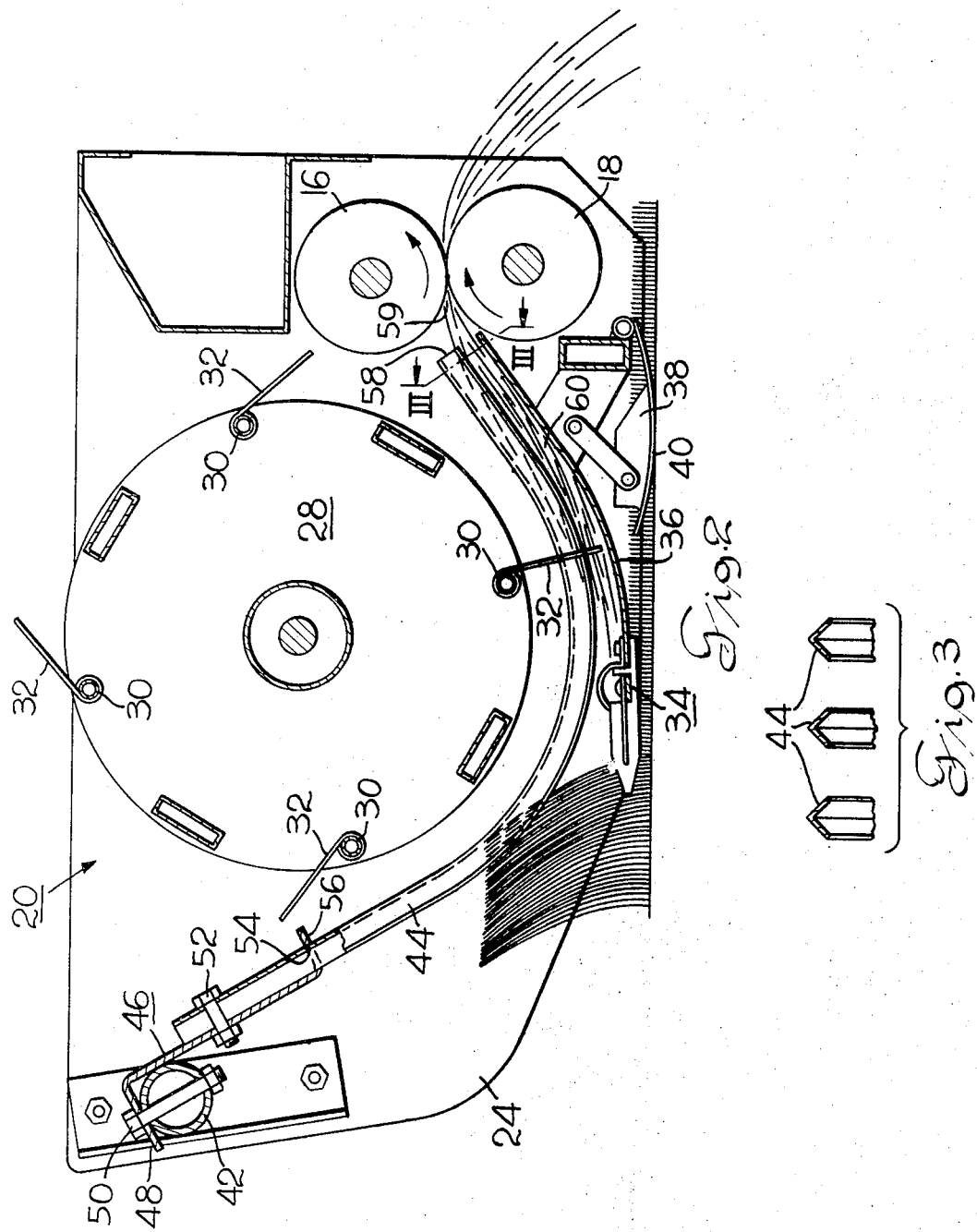

CROP CONDITIONERS

This invention relates to improvements in crop conditioners.

In certain crop conditions the crop conditioners of the prior art experienced difficulties particularly when handling crop material of a short and stiff consistency. This type of crop material had a tendency to bridge across the crushing rolls preventing material from entering between the rolls and ultimately plugging the machine.

The present invention provides means for guiding crop material from the sickle mechanism to a point between the crushing rolls wherein the crop material is denied the opportunity of bridging the crushing rolls.

An object of this invention is to prevent bridging of material and subsequent plugging in front of the crushing rolls.

A further object is to accomplish this purpose with an inexpensive improvement.

A further object is to provide an improvement for crop conditioners which is readily installed and readily removed.

A further object of this invention is to provide an improvement for crop conditioners to aid in handling short stiff material but which improvement works in all crops.

A further object is to provide cantilever mounted tines carried by the lean bar of a crop conditioner for guiding crop material butt end first to the bight of the crushing rolls of such conditioner.

A further object of this invention is to make such tines from inexpensive angle iron material.

A still further object of this invention is to make such tines of angle iron material with the open position of the angle facing downwardly in crop contacting relation providing maximum resistance to movement of the crop material up between the tines and minimum resistance to movement of reel fingers down between the tines.

A further object of this invention is to provide a simple Z-bar connection between the lean bar and the tines which provides a cantilever mounting for the tines.

Other objects and advantages of this invention will become more apparent by reference to the detailed specification taken in conjunction with the illustrative drawings, in which FIG. 1 is a perspective view of a pull-type crop conditioner embodying the invention with some parts broken away for clarity of illustration;

FIG. 2 is a section view taken on line II—II of FIG. 1 with some parts removed; and FIG. 3 is a section view taken line III—III of FIG. 2 to show the angle iron construction of the tines.

Referring to the drawings, it is seen that the invention has been applied to a pull-type hay conditioner 10, whereas the invention is equally applicable to a self-propelled hay conditioner.

Hay conditioner 10 includes a main frame 12 supported by wheels 13 and having a drawbar structure 14 adapted to be connected to a hitch on a tractor (not shown). A pair of crushing rolls 16 and 18 (FIG. 2) are rotatably supported by frame 12 and are driven in the direction indicated by the arrows imposed on rolls 16 and 18 as shown in FIG. 2. A header 20 (FIG. 1) is pivotally mounted by conventional means (not shown) on frame 10 for movement about a transverse axis so that the height of the header 20 relative to the ground can be adjusted. A power transmitting means is provided including p.t.o. shaft 22 which is adapted to be coupled to a power source (not shown) on a tractor (not shown). PTO shaft 22 is operatively connected to the various components of conditioner 10 by means (not shown) of a conventional nature for driving same.

Header 20 is provided with side members 24 and 26 which rotatably support a reel structure 28 including reel bars 30 upon which fingers 32 are mounted. A transversely extending sickle mechanism 34 is carried by header 20 and includes a floor member 36 extending rearwardly from such sickle mechanism to a position adjacent lower crushing roll 18 (FIG. 2). Floor member 36 extends transversely from side 24 to side 26. A shoe assembly 38 (FIG. 2) is attached to floor 36 and is provided with a skid 40 which is adapted to ride on the ground during harvesting operation.

A lean bar 42 extends transversely and is attached to sides 24 and 26 of header 20. A series of fore-and-aft extending tines 44 are attached to lean bar 42 at transversely spaced intervals generally corresponding to the spacing of fingers 32 on reel bars 30 (FIG. 1). A Z-bar member 46 (FIG. 2) extending from side 24 to side 26 is utilized to support tines 44 from lean bar 42. Z-bar 46 can be made in several pieces if desired. One leg 48 of Z-bar 46 is bolted to lean bar 42 by means of bolts 50. Upper end portion of tines 44 are bolted to a midportion of Z-bar 46 by means of bolts 52. Each tine 44 is additionally restrained by being passed through an opening 54 in the other leg 56 of Z-bar 46. Thus, tines 44 are supported in a cantilever manner by lean bar 42 through the medium of Z-bar 46. From Z-bar 46 tines 44 extend downwardly and rearwardly encircling a portion of the periphery of reel 28 to a point 58 adjacent to the bight 59 between crushing rolls 16 and 18. Thus it is seen that tines 44 may be individually removed by removing the bolt 52 attaching same to Z-bar 46 and pulling the tine forwardly until it has cleared opening 54.

It is to be noted that fingers 32 of reel 28 extend beyond tines 44 generally in the area from sickle mechanism 34 rearwardly to approximately the ends of tines 44. Thus, fingers 32 move crop material rearwardly from sickle mechanism 34 through the passage 60 formed between floor member 36 and tines 44 to the bight 59 of rolls 16 and 18 which grasp such material therebetween and deliver it rearwardly while crushing same in the process.

In normal operation, with reasonably high crop material, lean bar 42 will lean the crop material forwardly so that the butt ends of the material desirably enter between the crushing rolls 16 and 18. With this type of crop material, the prior art conditioners function satisfactorily. It is only when the crop material is short as shown in FIG. 2 and wherein the lean bar 42 is unable to function, that bridging and plugging in front of the crushing rolls occurs. With the improved construction shown in FIG. 2, tines 44 take over part of the function of the lean bar by bending the short crop material forwardly and guiding the cut material into the rolls. After the crop material is cut by sickle mechanism 34 such cut material is moved along passage 60 formed by bottom 36 and tines 44, by the action of reel fingers 32 moving the material through such passage to a point 58 where the material can be grasped by rolls 16 and 18 without any bridging or plugging.

The embodiments of the invention in which an exclusive property or privilege is claimed are defined as follows:

1. In a hay conditioning machine adapted to be moved in a fore-and-aft direction by a prime power source vehicle having power take-off means, said machine comprising in combination: a main frame having means for supporting the machine on the ground, a header unit extending transversely of and means pivotally mounting said unit on said frame for pivotal movement transverse to said fore-and-aft direction between a lowered operating position and a raised transport position; crushing rolls extending transversely coextensive with said header and carried by said main frame; a lean bar carried by sides of said header and extending across the front of said machine for bending standing crop material forwardly; a sickle mechanism carried by said header and being transversely coextensive therewith, a floor member extending from said mechanism to a point adjacent the bight of said crushing rolls and being transversely coextensive with said header; a reel structure carried by said header in overlying relation to said sickle mechanism and said floor, fingers on said reel for moving cut crop material from said sickle mechanism over said floor to said crushing rolls; and tines attached to said lean bar and extending rearwardly under said reel and over said floor for guiding cut crop material being moved by said fingers from said sickle mechanism to said crushing rolls, said tines being transversely spaced apart a distance equal to the spacing of said fingers and being positioned in nonvertical alignment relative thereto, said tines bending standing crop material forwardly and also guiding cut crop material to the bight of said crushing rolls.

2. In a hay conditioning machine as recited in claim 1 and wherein said tines are made of inverted angle irons for preventing cut crop material from moving upwardly between tines when being transported from said sickle mechanism to said crushing rolls and allowing reel fingers to move easily downward.

3. In a hay conditioning machine as recited in claim 2 and wherein a Z-bar connector connects said tines to said lean bar and wherein said tines can be removed from said Z-bar by the removal of one bolt.

4. In a hay conditioning machine as recited in claim 3 and wherein said tines can be removed from said Z-bar by the removal of one bolt and by moving such tines rearwardly out of an opening in the upstanding leg of said Z-bar.

* * * * *